United States Patent
Weichbrodt et al.

(10) Patent No.: US 11,560,016 B2
(45) Date of Patent: Jan. 24, 2023

(54) CASTER

(71) Applicant: STEINCO Paul vom Stein GmbH, Wermelskirchen (DE)

(72) Inventors: Tobias Weichbrodt, Wermelskirchen (DE); Thorsten Delan, Wermelskirchen (DE)

(73) Assignee: STEINCO Paul vom Stein GmbH, Wermelskirchen (DE)

( * ) Notice: Subject to any disclaimer, the term of this patent is extended or adjusted under 35 U.S.C. 154(b) by 0 days.

(21) Appl. No.: 17/358,483

(22) Filed: Jun. 25, 2021

(65) Prior Publication Data

US 2022/0009281 A1 Jan. 13, 2022

(30) Foreign Application Priority Data

Jul. 7, 2020 (DE) .......................... 102020117833.6

(51) Int. Cl.
*B60B 33/00* (2006.01)
*B60B 33/02* (2006.01)

(52) U.S. Cl.
CPC ........ *B60B 33/023* (2013.01); *B60B 33/0042* (2013.01); *B60B 33/0049* (2013.01); *B60B 33/0057* (2013.01); *B60B 33/0068* (2013.01); *B60B 33/021* (2013.01)

(58) Field of Classification Search
CPC . Y10T 16/195; Y10T 16/196; B60B 33/0028; B60B 33/0055; B60B 33/0094; B60B 33/0039; B60B 33/0049; B60B 33/0057; B60B 33/0068; B60B 33/0081; B60B 33/0084; B60B 33/0092; B60B 33/025; B60B 33/021; B60B 33/023; B60B 33/0042; B60B 33/0073; B60B 33/0078; B60B 33/0086; B60B 37/10; B60B 2200/222; B60B 2200/242; B60B 2900/531; A61G 7/0528; F16D 49/00;
(Continued)

(56) References Cited

U.S. PATENT DOCUMENTS 3,571,842 A * 3/1971 Fricke ................... B60B 33/021
16/35 R
4,035,864 A * 7/1977 Schroder ............... B60B 33/021
16/35 R
(Continued)

FOREIGN PATENT DOCUMENTS

DE 69009392 T2 11/1994
DE 69303763 T2 3/1997
(Continued)

*Primary Examiner* — Chuck Y Mah
(74) *Attorney, Agent, or Firm* — Von Rohrscheidt Patents

(57) ABSTRACT

A caster for equipment, furniture and medical equipment, the caster including a support arm that includes a base portion and a top portion and receives an attachment bolt wherein the base portion supports a wheel axle that supports at least one wheel; a direction fixing device; and a movable blocking element configured to lock the direction fixing device, wherein the moveable blocking element is in direct or indirect friction contact with the wheel so that a friction force that is caused by the friction contact causes a locking of the direction fixing device and a direction fixing of the caster in a first direction when the caster moves in the first direction.

4 Claims, 7 Drawing Sheets

(58) Field of Classification Search
CPC ... F16D 65/42; F16D 2121/14; F16D 2125/32
See application file for complete search history.

(56) References Cited

U.S. PATENT DOCUMENTS

| | | | | |
|---|---|---|---|---|
| 4,720,893 A * | 1/1988 | Mellwig | ................ | B60B 33/02 16/35 R |
| 5,263,226 A | 11/1993 | Mobilor | | |
| 5,371,922 A * | 12/1994 | Chern | ................ | B60B 33/0094 16/35 R |
| 6,360,851 B1 * | 3/2002 | Yang | ................ | B60B 33/0068 16/35 R |
| 7,861,370 B2 * | 1/2011 | Chu | ................ | B60B 33/0073 16/35 R |
| 7,950,108 B2 * | 5/2011 | Yang | ................ | B60B 33/0049 16/35 R |
| 8,079,606 B2 | 12/2011 | Dull et al. | | |
| 8,220,110 B1 * | 7/2012 | Chen | ................ | B60B 33/0007 16/35 R |
| 8,539,640 B1 * | 9/2013 | Waggener | ................ | B60B 33/02 16/35 R |
| 2006/0254867 A1 * | 11/2006 | Yan | ................ | B60B 33/025 188/73.1 |
| 2009/0206565 A1 | 8/2009 | Dooley | | |
| 2013/0111664 A1 * | 5/2013 | Childs | ................ | A61G 7/0528 280/80.1 |
| 2014/0143982 A1 * | 5/2014 | Hamasaki | ................ | B60B 33/025 16/35 R |
| 2014/0238784 A1 * | 8/2014 | Yeo | ................ | B60B 33/021 188/1.12 |
| 2019/0358998 A1 * | 11/2019 | Patmore | ................ | F16D 49/00 |

FOREIGN PATENT DOCUMENTS

| | | |
|---|---|---|
| DE | 10047006 A1 | 4/2002 |
| DE | 20317456 U1 | 2/2004 |
| JP | H5185802 A | 7/1993 |
| WO | WO9325398 A1 | 12/1993 |

* cited by examiner

CASTER

RELATED APPLICATIONS

This application claims priority from German patent application DE 10 2020 117 833.6 filed on Jul. 7, 2020 which is incorporated in its entirety by this reference.

FIELD OF THE INVENTION

The invention relates to a caster for equipment, furniture and in particular medical equipment

BACKGROUND OF THE INVENTION

DE 203 17 456 U1 discloses a caster with a direction fixing device wherein an interlocking plunger engages a pointed teething of an interlocking disk 19 to provide direction fixing when a foot lever is actuated.

DE 100 47 006A1 discloses a steerable caster for equipment, furniture, and hospital beds, wherein a brake device that fixes a pivot direction and/or fixes a wheel rotation is controllable by an actuation rod.

When transporting heavy medical equipment in a hospital it has become apparent that direction changes are difficult to perform for a single person in tight hospital alleys or rooms when manual operator interference is required.

BRIEF SUMMARY OF THE INVENTION

Thus, it is an object of the invention to provide a new caster for equipment, furniture, and in particular medical equipment where an automatic direction fixing is provided when driving straight after a directional change wherein the automatic direction fixing occurs without manual interference.

The object is achieved by a caster for equipment, furniture and medical equipment, the caster including a support arm that includes a base portion and a top portion and receives an attachment bolt wherein the base portion supports a wheel axle that supports at least one wheel; a direction fixing device; and a movable blocking element configured to lock the direction fixing device, wherein the moveable blocking element is in direct or indirect friction contact with the wheel so that a friction force that is caused by the friction contact causes a locking of the direction fixing device and a direction fixing of the caster in a first direction when the caster moves in the first direction.

It is an essential advantage of the invention that the moveable blocking element guarantees straight travel in the desired direction while traveling in one direction due to the frictional force that is generated during the travel and that impacts the blocking element. A new blocking of the direction fixing device is automatically performed after a standstill of the caster in a first direction and change of the direction and commencement of travel in a second direction.

This makes life easy for medical personnel pushing medical equipment since no hand or foot actuation is required to make the direction fixing device engage so that transportation of the equipment is simplified significantly.

In an advantageous embodiment of the invention the blocking element is loaded by a spring wherein a spring force of the spring counteracts the friction force. Thus it is reliably assured that the blocking element moves out of the blocking position in the direction fixing device due to the spring force after the friction force has ceased after the movement of the caster into the first direction has come to the standstill.

In an advantageous embodiment of the invention the blocking element is formed as a friction shoe that is supported on the wheel proximal to the direction fixing device wherein the friction shoe includes a blocking rod that is vertically arranged at the friction shoe and that is moveably supported above the wheel surface of the direction fixing device. This embodiment is advantageously simple.

In another advantageous embodiment of the invention the blocking element is pivotably arranged on the wheel axle, wherein a first arm of the blocking element is provided with a blocking protrusion that can engage the direction fixing device and wherein a second arm of the blocking element is at least in indirect frictional contact with an inner circumference of a wheel rim.

This embodiment has the advantage that it can be arranged in an interior of the caster quite easily and that it is suitable for single and twin casters.

In this embodiment that it is also possible that the free end portion of the second arm of the blocking element is provided with an actuation weight that is configured as a protrusion wherein a gravitational force of the actuation weight that engages at a distance from the arm axis provides a torque when the caster is at a standstill wherein the torque automatically disengages the direction fixing.

This actuation weight provides reliable unlocking of the direction fixing device after the standstill of the caster and associated cessation of the frictional force.

DETAILED DESCRIPTION OF THE INVENTION

Figure 1:
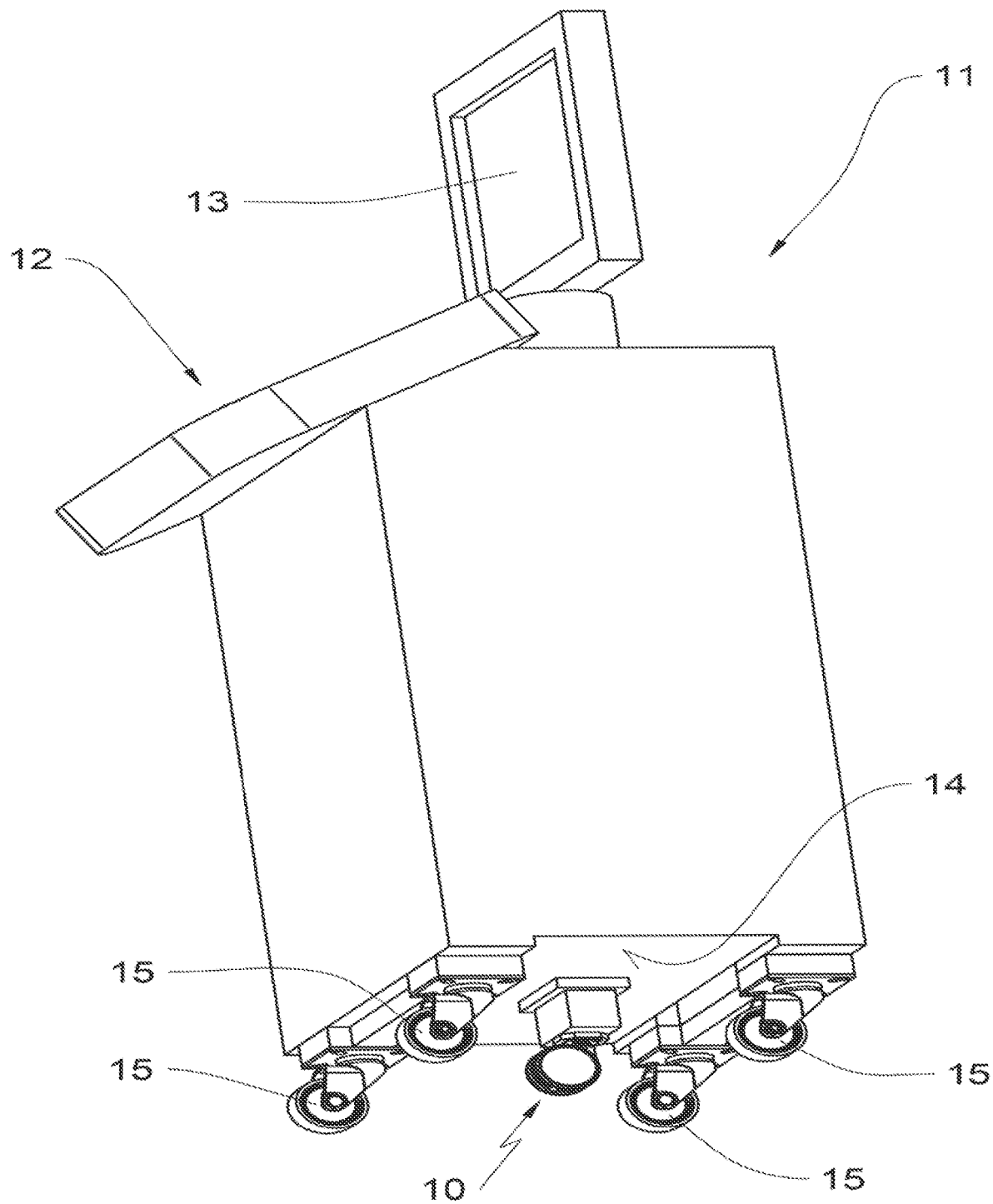
FIG. 1 illustrates a perspective bottom view of a piece of medical equipment.

In the drawing figures, a caster for equipment, furniture and medical equipment with the direction fixing device is designated overall with reference numeral 10.

FIG. 1 illustrates a perspective bottom view of a piece of medical equipment 11 with a data entry field 12 and a screen 13. A bottom side 14 includes four steerable casters 15 and a central fifth caster 10 with automatic direction fixing.

As a matter of principle it is also possible that one or plural of the four steerable casters 15 but not the additional fifth caster 10 are provided with the automatic direction fixing according to the invention.

Figure 2:
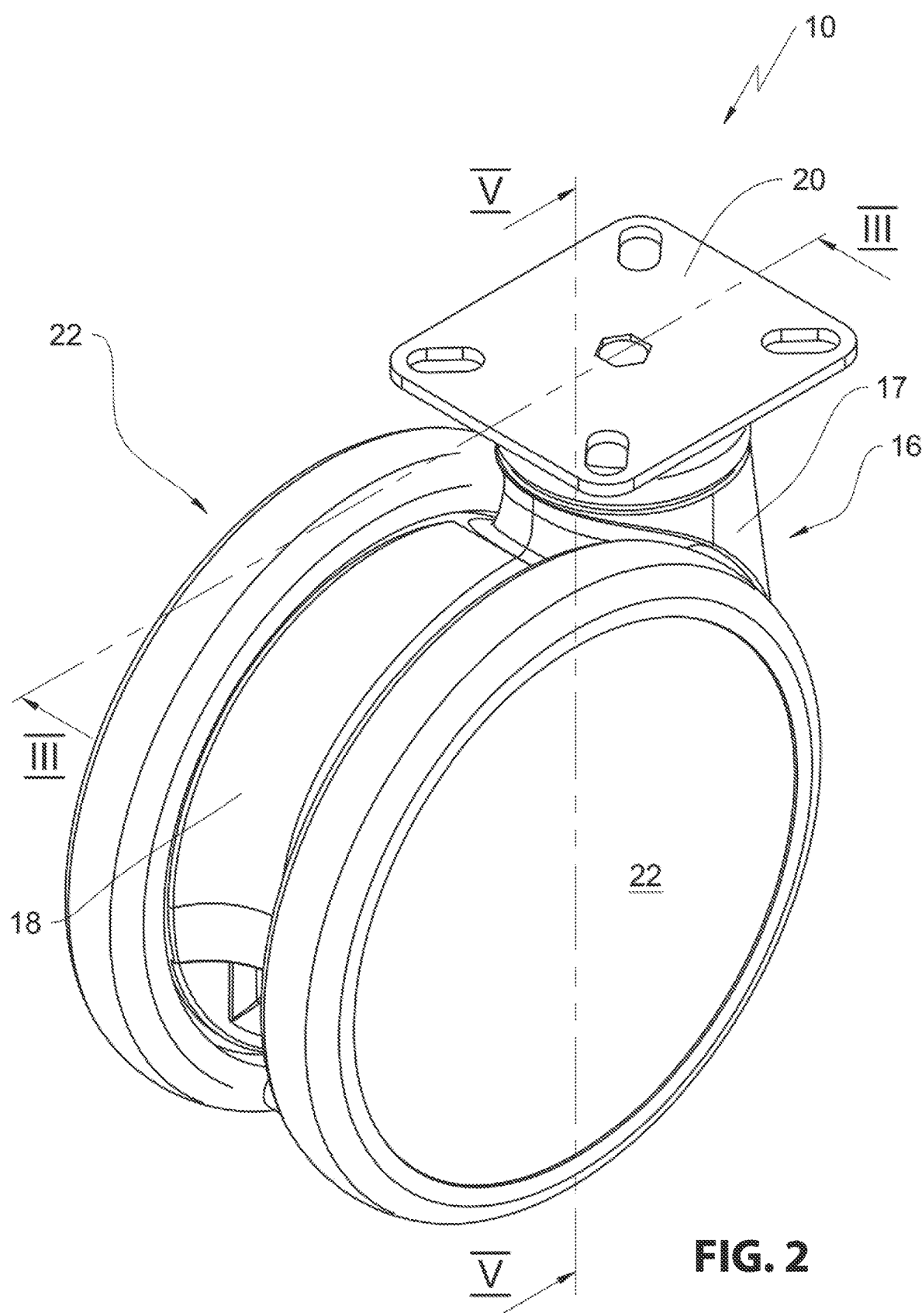
FIG. 2 illustrates a perspective view of a fifth caster that is provided with automatic direction fixing.

FIG. 2 illustrates a perspective view of the fifth caster 10 according to the invention showing a support element 16 including a top element 17 and a base element 18. The top element 17 of the support element 16 includes an attachment bolt 19 shown in FIG. 3 including a bolt on plate 20, wherein wheels 22 are rotatably attached on wheel axles 21 at the base element 18 as illustrated in FIG. 3.

Figure 3:
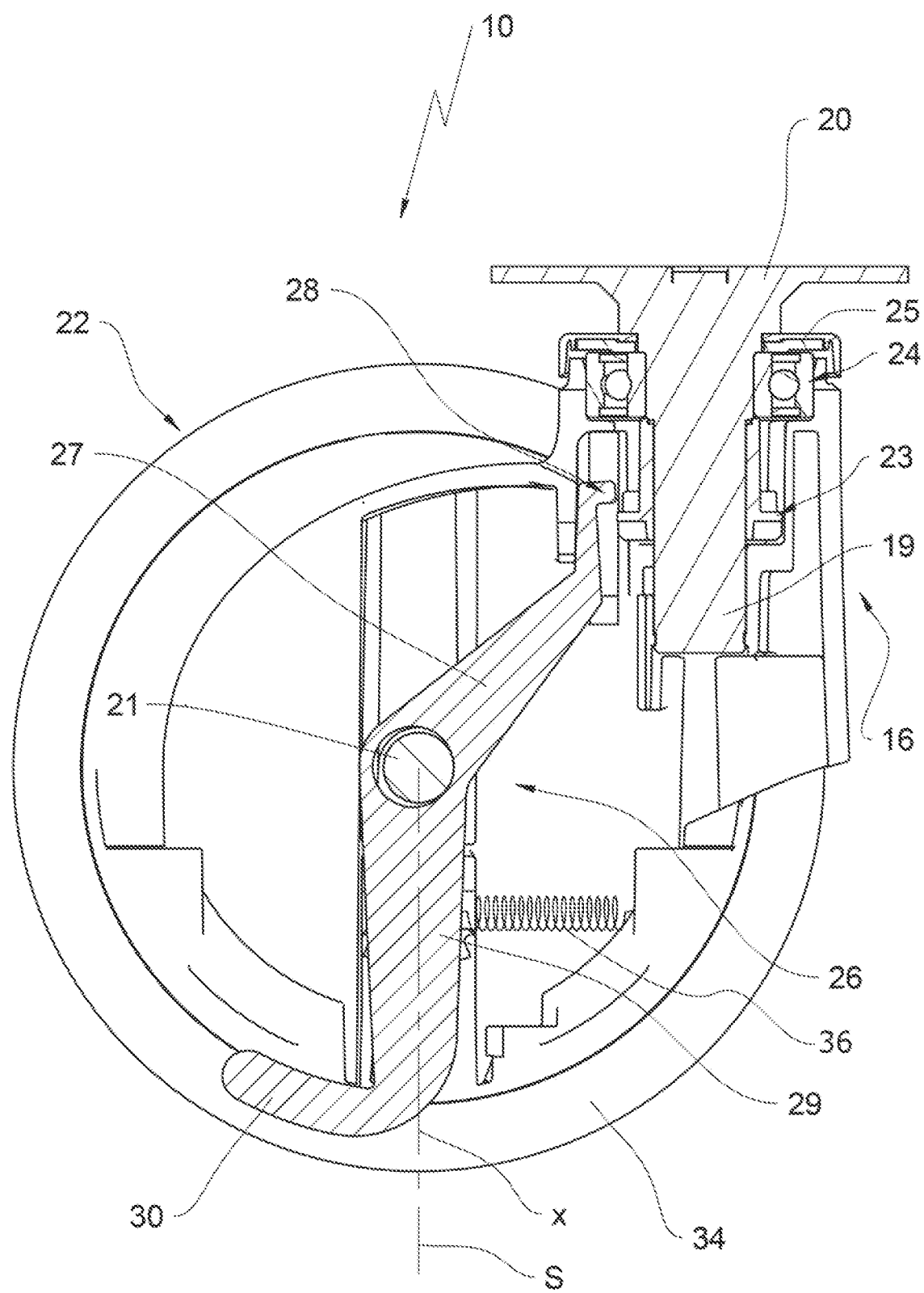
FIG. 3 illustrates a cross-sectional view according to sectional III-III in FIG. 2.

FIG. 3 illustrates a sectional view according to the sectional line III-III in FIG. 2. A bearing 24 and a cover 25, an interlocking disc functioning as a direction fixing device 23 are arranged in the support element 16 at the attachment bolt 19.

Figure 7:
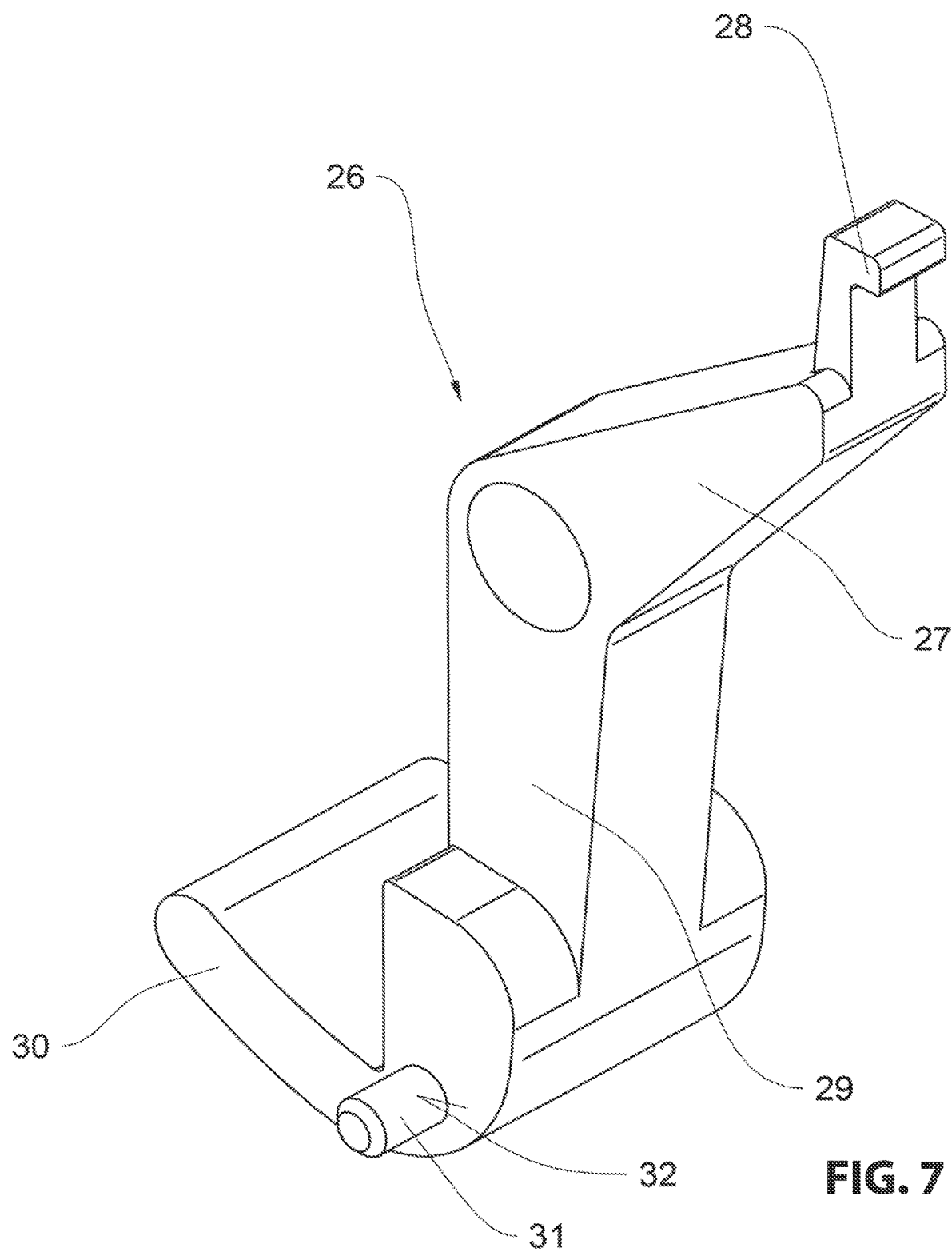
FIG. 7 illustrates of perspective view of the direction fixing device.

The wheel axle 21 supports a pivotable blocking element 26 as evident from FIG. 7, wherein a first upward protruding arm 27 of the blocking element is provided with a blocking protrusion 28 that is able to engage the interlocking disc that functions as the direction fixing device 23.

A second arm 29 extends in the gravitational direction s and includes an actuation weight 30 configured as a lateral protrusion wherein the actuation weight is offset from an arm axis x and provides a torque when the caster 10 is at the standstill wherein the torque automatically releases the direction fixing.

Figure 4:
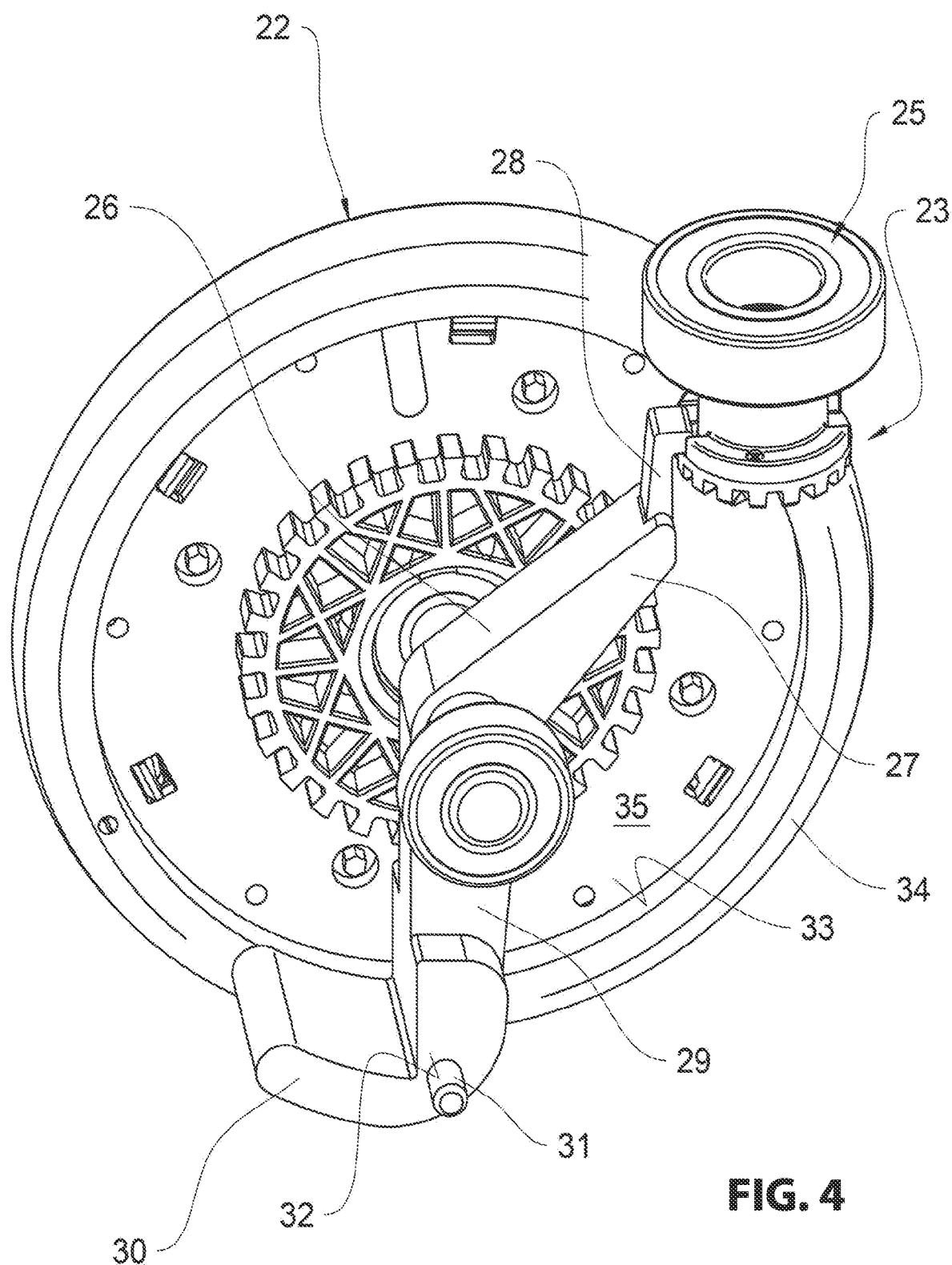
FIG. 4 illustrates a partial view of the caster according to FIG. 2 with the direction fixing device.
Figure 5:
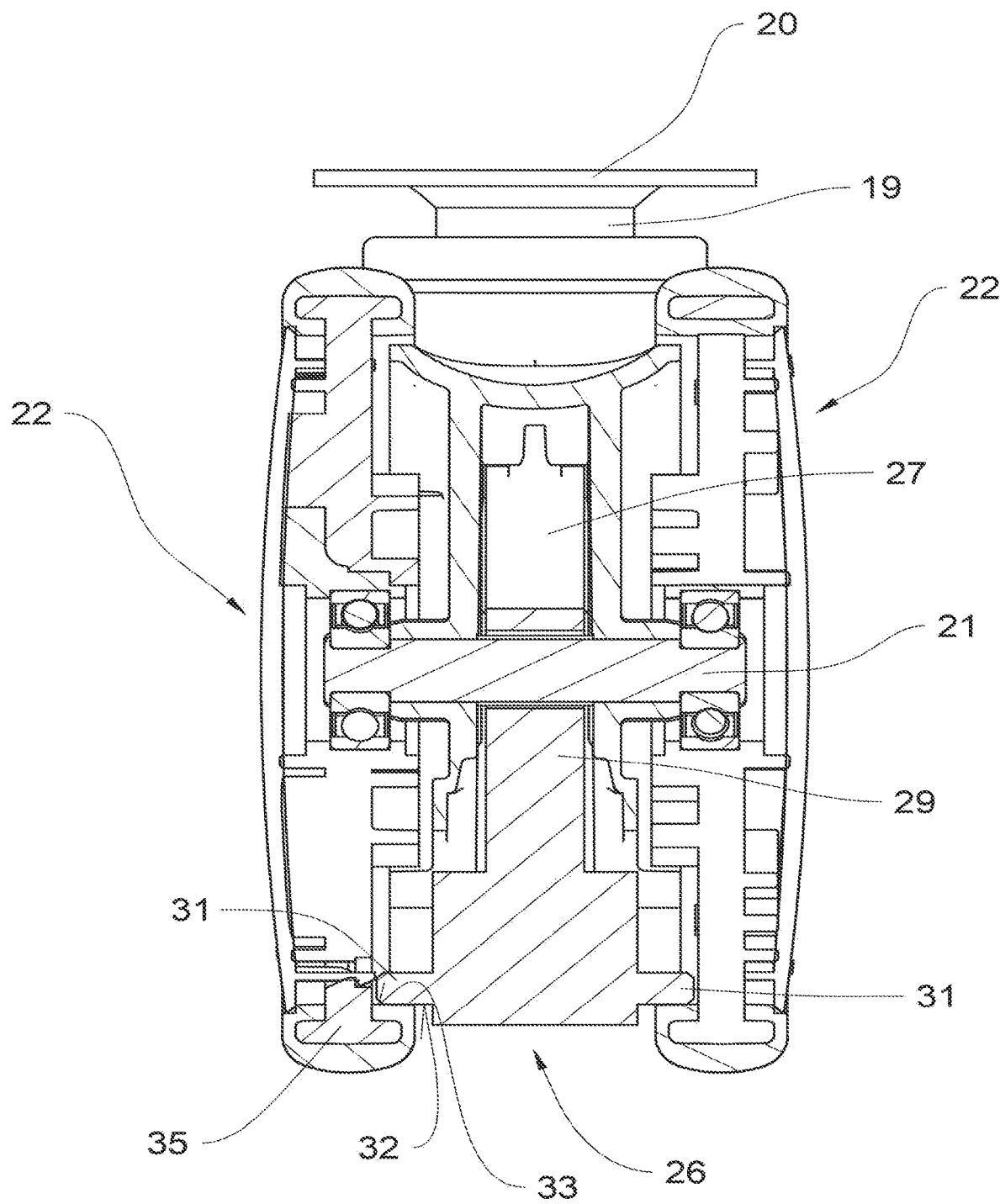
FIG. 5 illustrates a sectional view of the caster according to sectional line V-V in FIG. 2.

As evident in particular FIGS. 4 and 5 a respective friction bolt 31 is arranged on both sides at free ends of the second arm 29 wherein an outer circumferential surface 32 of the friction bolt is in frictional contact with an inner circumferential surface 33 of the tire 34, wherein the tires 34 are attached on rims 35 by form locking engagement.

FIG. 3 illustrates the unlocked position. This means the blocking element does not engage the locking disc of the direction fixing device 23. By the same token the arm axis x coincides with the gravitational direction s.

Figure 6:
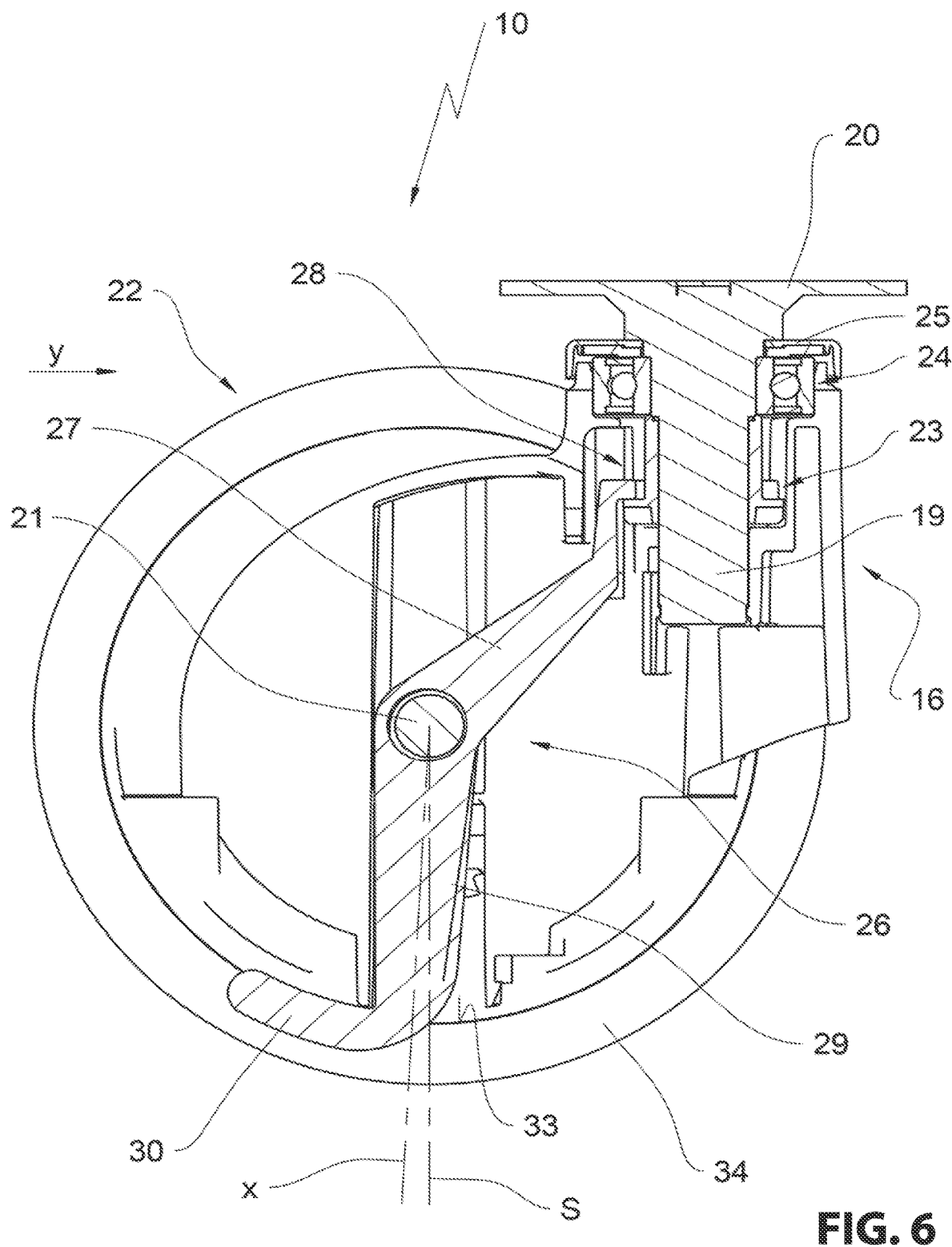
FIG. 6 illustrates a sectional view of the caster according to sectional line III-III in FIG. 2.

When the wheel 22 moves in y-direction a clockwise frictional force is generated in the portion of the friction bolt 31 and the inner circumferential surface 33. The torque thus generated moves the blocking element 26 into the locked position illustrated in FIG. 6. In particular the blocking protrusion 28 engages the locking disc which causes a direction fixing during straight travel. It is evident that the second arm 29 has moved clockwise and the arm axis x does not extend in the gravitational direction anymore.

As soon as the wheel 22 is at a standstill again the clockwise frictional force and the associated torque are zero so that the blocking element 26 moves into the unlocking position again due to the weight force of the actuation weight 30 as illustrated in FIG. 3. A spring 36 can be used to augment the weight force and pull the blocking element 26 to unlock the direction fixing device 23.

REFERENCE NUMERALS AND DESIGNATIONS

10 caster with direction fixing device
11 piece of medical equipment
12 data entry field
14 bottom side of 11
15 steering caster
16 support element
17 top element
18 base element
19 attachment bolt
20 carrier plate
21 wheel axle
22 wheel
23 direction fixing device
24 bearing
25 cover
26 blocking element
27 first arm
28 blocking protrusion
29 second arm
30 actuation weight
31 friction bolt
32 outer circumferential surface
33 inner circumferential surface
34 tire
35 rim
36 spring
S gravity direction
x arm axis
y driving direction

What is claimed is:

1. A caster for equipment, furniture and medical equipment, the caster comprising:
   a support element that includes a base portion and a top portion and receives an attachment bolt wherein the base portion supports a wheel axle that supports at least one wheel;
   a direction fixing device that fixes a direction of the support element relative to the equipment, furniture and medical equipment when the direction fixing device is locked; and
   a movable blocking element configured to lock the direction fixing device,
   wherein the moveable blocking element is in direct or indirect friction contact with the wheel so that a friction force that is caused by the friction contact causes a locking of the direction fixing device and fixes the direction of the support element in a first direction when the caster moves in the first direction,
   wherein the moveable blocking element is loaded by a spring, and
   wherein a spring force of the spring acts upon the movable blocking element in an opposite direction to the friction force and releases the direction locking of the caster when the caster is at a standstill,
   wherein the movable blocking element is pivotably supported on the wheel axle,
   wherein a first arm of the movable blocking element includes a blocking protrusion that is configured to engage the direction fixing device, and
   wherein a second arm of the movable blocking element is in direct or indirect friction contact with an inner circumferential surface of the wheel.

2. A caster for equipment, furniture and medical equipment, the caster comprising:
   a support element that includes a base portion and a top portion and receives an attachment bolt wherein the base portion supports a wheel axle that supports at least one wheel;
   a direction fixing device that fixes a direction of the support element relative to the equipment, furniture and medical equipment when the direction fixing device is locked; and
   a movable blocking element configured to lock the direction fixing device,
   wherein the moveable blocking element is in direct or indirect friction contact with the wheel s that a friction force that is caused by the friction contact causes a locking of the direction fixing device and fixes the direction of the support element in a first direction when the caster moves in the first direction,
   wherein the moveable blocking element is loaded by a spring, and
   wherein a spring force of the spring acts upon the movable blocking element in an opposite direction to the friction force and releases the direction locking of the caster when the caster is at a standstill.

3. A caster for equipment, furniture and medical equipment, the caster comprising:
- a support element that includes a base portion and a top portion and receives an attachment bolt wherein the base portion supports a wheel axle that supports at least one wheel;
- a direction fixing device that fixes a direction of the support element relative to the equipment, furniture and medical equipment when the direction fixing device is locked; and
- a movable blocking element configured to lock the direction fixing device,
- wherein the moveable blocking element is in direct or indirect friction contact with the wheel so that a friction force that is caused by the friction contact causes a locking of the direction fixing device and fixes the direction of the support element in a first direction when the caster moves in the first direction,
- wherein the movable blocking element is pivotably supported on the wheel axle, and
- wherein a first arm of the movable blocking element includes a blocking protrusion that is configured to engage the direction fixing device, and
- wherein a second arm of the movable blocking element is in direct or indirect friction contact with an inner circumferential surface of the wheel.

4. The caster according to claim 3,
- wherein a free end portion of a second arm of the movable blocking element includes an actuation weight that is configured as a protrusion, and
- wherein a weight force of the actuation weight that impacts with the movable blocking element at a distance from a rotation axis of the movable blocking element generates a torque that moves the movable blocking element to unlock the direction fixing device when the caster is at a standstill.

* * * * *